United States Patent [19]

Nemirofsky et al.

[11] Patent Number: 5,880,769
[45] Date of Patent: Mar. 9, 1999

[54] INTERACTIVE SMART CARD SYSTEM FOR INTEGRATING THE PROVISION OF REMOTE AND LOCAL SERVICES

[75] Inventors: Frank Nemirofsky, Burbank; John C. Morris, Pasadena, both of Calif.

[73] Assignee: SmartTV Co., Burbank, Calif.

[21] Appl. No.: 419,665

[22] Filed: Apr. 10, 1995

Related U.S. Application Data

[63] Continuation-in-part of Ser. No. 183,525, Jan. 19, 1994, Pat. No. 5,594,493.

[51] Int. Cl.$^6$ ...................................................... H04N 7/08
[52] U.S. Cl. .............................. 348/12; 348/13; 348/465; 348/460; 348/453; 349/552
[58] Field of Search ...................................... 348/1, 3, 4, 6, 348/7, 9, 10, 12, 13, 14, 16, 17, 460–463, 465, 467, 468, 473, 475, 476, 486, 479, 563, 564, 569–570, 907; 455/2, 3.1, 3.2, 4.1, 4.2, 5.1, 6.1, 6.2, 6.3; 235/375, 379, 380, 381, 383, 385, 376; 364/410–412, 400, 402, 401, 403, 406, 478, 479; H04N 7/08, 7/00, 7/087

[56] References Cited

U.S. PATENT DOCUMENTS

| 4,210,329 | 7/1980 | Steiger et al. . |
| 4,211,919 | 7/1980 | Ugon ........................................ 235/487 |
| 4,382,279 | 5/1983 | Ugon ........................................ 364/200 |
| 4,523,297 | 6/1985 | Ugon et al. .............................. 364/900 |
| 4,599,644 | 7/1986 | Fischer .................................... 348/10 X |
| 4,656,342 | 4/1987 | Ugon ........................................ 235/379 |
| 4,807,031 | 2/1989 | Broughton et al. . |
| 4,825,052 | 4/1989 | Chemin et al. ......................... 235/380 |
| 4,977,455 | 12/1990 | Young . |
| 4,999,617 | 3/1991 | Uemura et al. ...................... 348/473 X |
| 5,025,373 | 6/1991 | Keyser, Jr. et al. .................... 364/408 |
| 5,047,614 | 9/1991 | Bianco .................................... 235/385 |
| 5,144,663 | 9/1992 | Kudelski et al. . |
| 5,253,066 | 10/1993 | Vogel . |
| 5,262,860 | 11/1993 | Fitzpatrick et al. ...................... 348/12 |
| 5,285,055 | 2/1994 | Oonakahara et al. .................. 235/380 |
| 5,285,278 | 2/1994 | Holman .................................. 358/142 |
| 5,287,181 | 2/1994 | Holman .................................. 348/473 |
| 5,288,979 | 2/1994 | Kreft ....................................... 235/380 |
| 5,293,424 | 3/1994 | Holtey et al. ............................. 380/23 |
| 5,299,940 | 4/1994 | Uenaka et al. ............................ 439/76 |
| 5,305,383 | 4/1994 | Guillou et al. ............................ 380/24 |
| 5,311,396 | 5/1994 | Steffen ................................... 361/736 |
| 5,319,453 | 6/1994 | Copriviza et al. .......................... 348/6 |
| 5,321,240 | 6/1994 | Takahira ................................. 235/380 |
| 5,341,421 | 8/1994 | Ugon ......................................... 380/4 |
| 5,535,147 | 7/1996 | Jacobs et al. ...................... 364/705.07 |
| 5,570,295 | 10/1996 | Isenberg et al. . |
| 5,594,493 | 1/1997 | Nemirofsky ............................. 348/13 |
| 5,663,766 | 9/1997 | Sizer . |
| 5,671,267 | 9/1997 | Auguest et al. . |

FOREIGN PATENT DOCUMENTS 0399897  5/1990  European Pat. Off. .

Primary Examiner—Nathan Flynn
Attorney, Agent, or Firm—Irell & Manella LLP

[57] ABSTRACT

The present invention includes methods and apparatus for increasing the efficiency of remote service transactions. According to the present invention, a smart card includes optics for receiving information from a television channel and a modem for providing real-time two way communication with a remote service provider. To maintain system security, data that is provided to the card may be encrypted. The present invention also includes applications of the smart card such as remote financial services, near video-on-demand with automated order and billing, pay-per-view with automated order and billing, appointment TV, home shopping, real-time market studies and opinion polls and electronic gaming and sweepstakes.

22 Claims, 4 Drawing Sheets

INTERACTIVE SMART CARD SYSTEM FOR INTEGRATING THE PROVISION OF REMOTE AND LOCAL SERVICES

The present invention is a Continuation-in-Part of U.S. patent application Ser. No. 08/183,525, filed Jan. 19, 1994 now U.S. Pat. No. 5,594,493, which is herein incorporated by reference.

FIELD OF THE INVENTION

The present invention relates to portable information and communication systems, and more particularly, to communication between a hand held portable electronic device and various local and remote services.

ART BACKGROUND

Consumers today are confronted with a bewildering variety of goods and services such as cable television, financial transactions and home shopping catalogues. Currently, consumers must separately access each distinct service. For example, to order a pay-per view movie currently requires contacting a cable television operator through one device, often a telephone, and contacting a bank through a different device, an automatic teller machine or a computer. There are many other examples of the splintering of goods and services amongst different devices, which causes consumer confusion and inefficiency.

Apart from the difficulties from the consumer's standpoint, present technology does not provide for efficient data gathering and similar functions. For example, present opinion polls are typically conducted by telephone, which is expensive and time consuming, which may deter persons from participating in the poll. Other data gathering operations suffer from similar flaws.

Present information technology has further limitations. Despite an existing infrastructure of cable television channels, the television industry has yet to provide consumers with the type of interactivity becoming increasing popular in multimedia applications. There is thus a need for a device that allows existing communication infrastructures to provide real time interactivity for television.

As will be described, the present invention solves the disparate problems presented by current technology by integrating a wide variety of interfaces to goods, services and other information providers within a hand held, portable device. The present invention achieves real time interactivity for television networks or other sources and is convenient for consumers. These and other advantages of the present invention will be apparent from the following description.

SUMMARY OF THE INVENTION

The present invention includes methods and apparatus for increasing the efficiency of remote service transactions. According to the present invention, a smart card includes a light sensor for receiving data from a display, such as for example a television, wherein the data is encoded in the spectrum of light provided by the display. The light sensor is coupled to a central processing unit (CPU) and a random access memory (RAM). The CPU and RAM and a read only memory (ROM) are coupled to a modem.

In operation, the smart card receives information associated with a remote service provider from light emitted from the television display and receives input from a user. Based upon the the information received from the television and the user's input, the modem is provided with a telephone number to carry out an automated transaction with the remote service provider. To maintain system security, data that is provided to the card may be encrypted.

The present invention also includes specific applications of the smart card. These services include: remote financial services, near video-on-demand with automated order and billing, pay-per-view with automated order and billing, appointment TV, home shopping, real-time market studies and opinion polls and electronic gaming and sweepstakes.

IN THE DRAWINGS

FIG. 6b is a side view of the embodiment illustrated in FIG. 6a.

PREFERRED EMBODIMENT

The present invention discloses apparatus and methods for providing various services to a consumer through the use of a smart card. In the following description, numerous specific details are set forth such as the shape of the smart card and various interfaces in order to provide a through understanding of the present invention. However, it will be apparent to one skilled in the art that the present invention may be practiced without these specific details. In other instances, well known circuits, structures and the like are not described in detail so as not to obscure the present invention unnecessarily.

SYSTEM OVERVIEW

Figure 1:
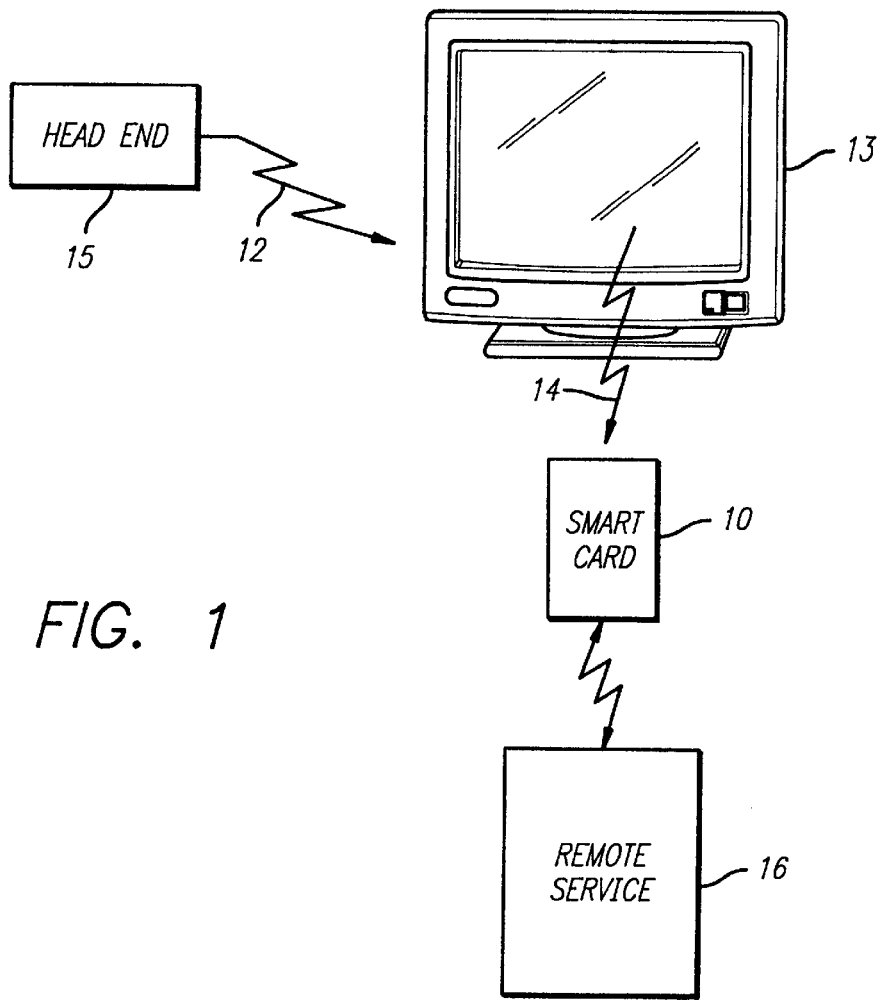
FIG. 1 is a block diagram of the communication interfaces between a smart card of the present invention and television and remote service providers.

FIG. 1 illustrates communication interfaces to a smart card 10 of the present invention. As illustrated in the figure, the smart card 10, which includes a modem as will be described more fully below, communicates with a remote service 16 over a two way communication medium such as a telephone line. The remote service 16 may comprise any type of service that supports digital communication and specific remote services will be described more fully below.

In addition to the two way communication link between the smart card 10 and the remote service 16, the smart card 10 is capable of receiving non-visual information from light 14 emitted through a television screen 13 where the information has been encoded through a VEIL (which stands for "Video Encoded Invisible Light") protocol onto the signal 12 provided by a head end 15. The VEIL interface is described more fully in the copending application, entitled "COM-CARD", filed Jan. 19, 1994, Ser. No. 08/183/525 and incorporated herein by reference. The combination of interfaces with the head end 15 and the remote service provider 16 results in greatly enhanced functionality, as will be described more fully below.

Figure 2:
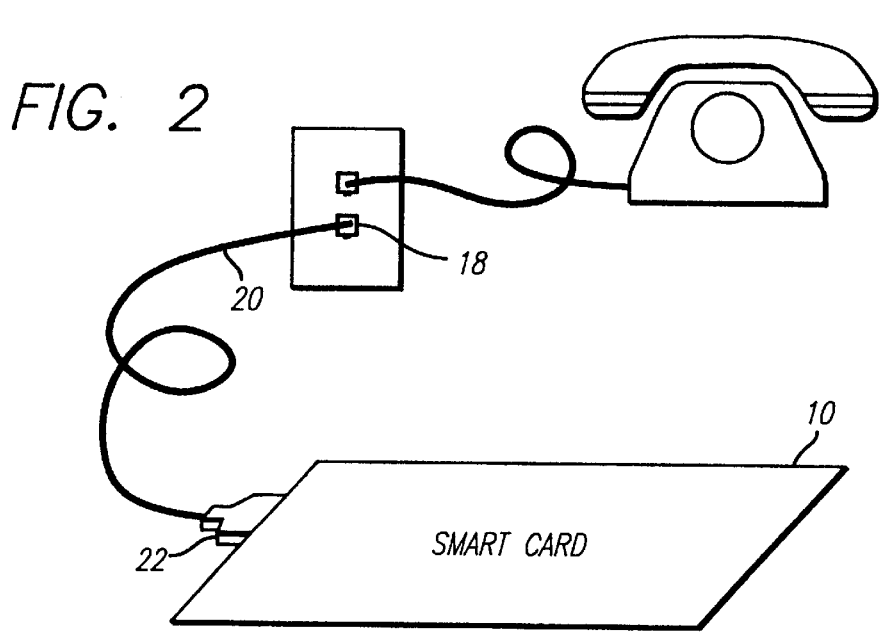
FIG. 2 illustrates one possible interface between the smart card of the present invention and a service provider.

FIG. 2 illustrates one possible interface between the smart card 10 and the service provider 16. As shown, the smart card 10 is coupled to a telephone line by a standard RJ11 telephone jack 18 or cellular phone data port through a cord assembly 20. In turn, the cord assembly 20 is coupled to the smart card 10 by a PCMCIA style mini-connector 22. In an alternate embodiment, the smart card 10 may be coupled to the cord assembly 20 by a slip-on slide connector on the smart card 10. As will be appreciated, there are many other mechanisms for coupling the smart card 10 to a telephone line 10. In yet another alternate embodiment, the smart card 10 contains a wireless interface (not shown) that supports wireless telethony through either a satellite or other communications system such as a cellular network.

Figure 3:
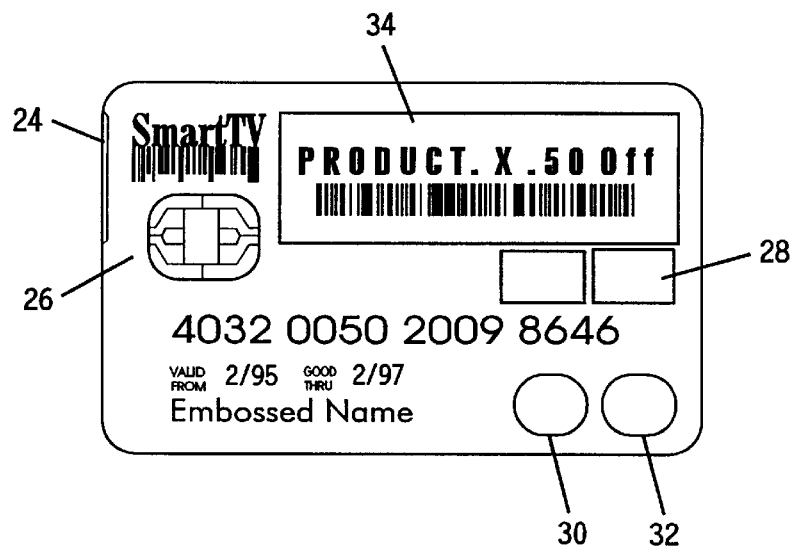
FIG. 3 illustrates one side of the smart card of the present invention.

FIG. 3 illustrates one side of the smart card 10. As shown, the card includes optics 24 for receiving light from a display, an ISO 7816 interface 26, a hologram 28, buttons 30 and 32 and an LCD Screen 34. The smart card 10 displays various menus on the LCD Screen 34 and a user of the smart card 10 may select menu options and provide other input to the smart card 10 through the buttons 30 and 32. Many other types of user interfaces are possible.

As will be described more fully below, the ISO 7816 interface 26 allows the smart card 10 to be used in conjunction with other devices. As one example, the smart card may be used as a card for an automatic teller machine that is compatible with the ISO 7816 interface 26.

Figure 4:
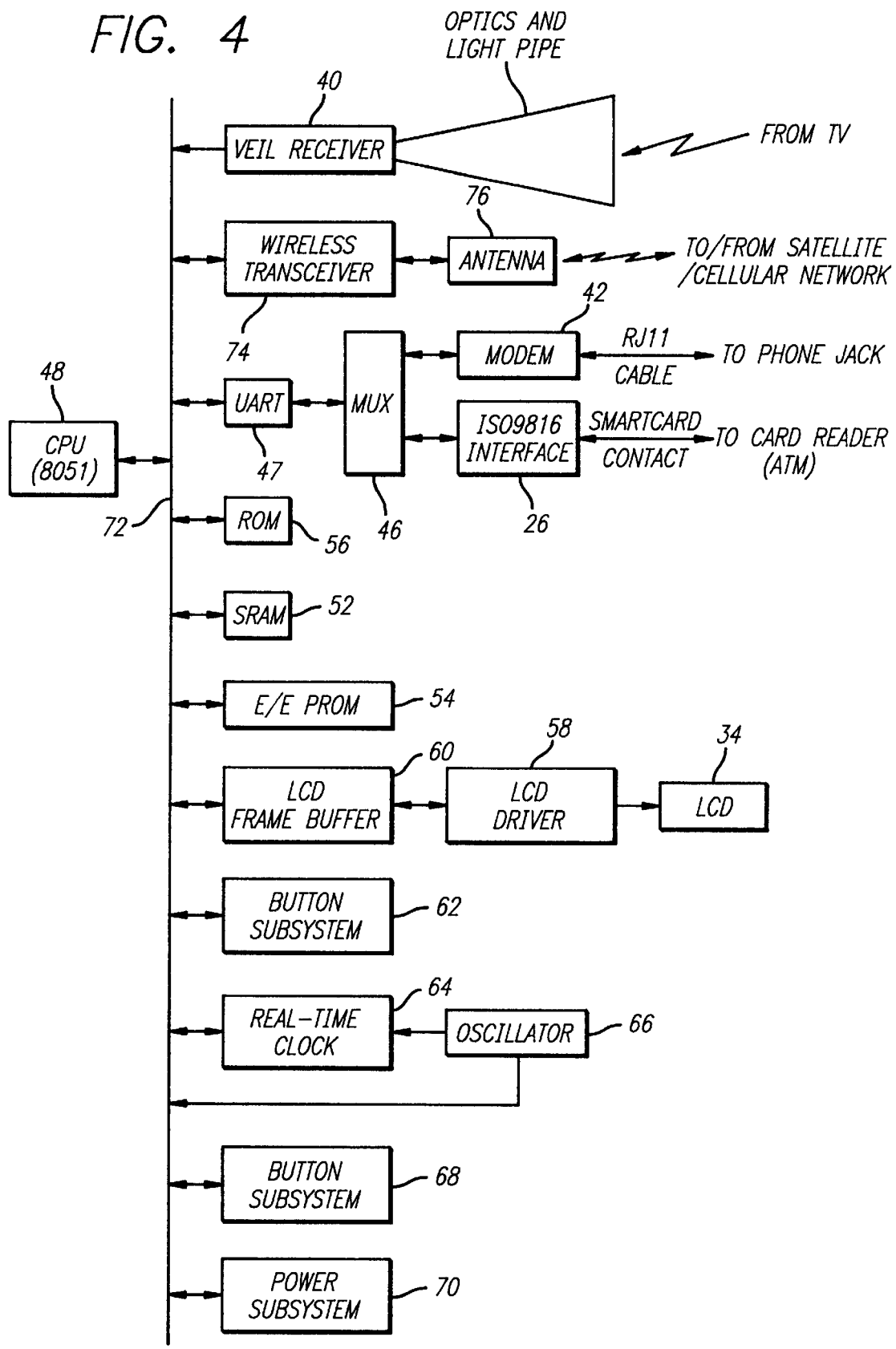
FIG. 4 is a block diagram of the electronics disposed within the smart card of the present invention.

FIG. 4 is a block diagram of the electronics disposed within the smart card 10. Data from external sources is converted into digital data. Thus, as illustrated, a modem 42 and the ISO 7816 interface 26 are coupled to a multiplexer 46, which provides serial data to a universal asynchronous receiver-transmitter (UART) 47. In a preferred embodiment, the modem 42 is compatible with a standard modem protocol such as Bell 300, and supports auto-dial. The UART 47 in turn provides parallel data to a bus 72, which is coupled to a central processing unit (CPU) 48 and a static random access memory 52. A VEIL receiver 40 that is coupled to the bus 72. A transceiver 74 coupled to the bus 72 converts electromagnetic waves of lower frequency than visible light received over antenna 76 into digital data.

The external data is provided to the SRAM 52 where it is processed by the CPU 48 according to program in the ROM 50 and EEPROM 54. A button subsystem 62 is coupled to the buttons 30 and 32 and allows the user to make selections based upon the external data and provide other input to the smart card 10. Information is provided to the user by the LCD 34 that is coupled to an LCD driver 58 that is in turn coupled to an LCD frame buffer 60 that is coupled to the bus 72.

Still referring to FIG. 4, the smart card 10 includes a power subsystem 70 to provide power to the electronic components. According to one embodiment, the power subsystem 70 includes a non-rechargeable power source and in an alternate embodiment, the power subsystem 70 includes a combination of a non-rechargeable and rechargeable power sources and a solar panel in conjunction with power supply logic. Still referring to FIG. 4, an oscillator 66 and clock 64 to maintain the appropriate time.

Figure 5:
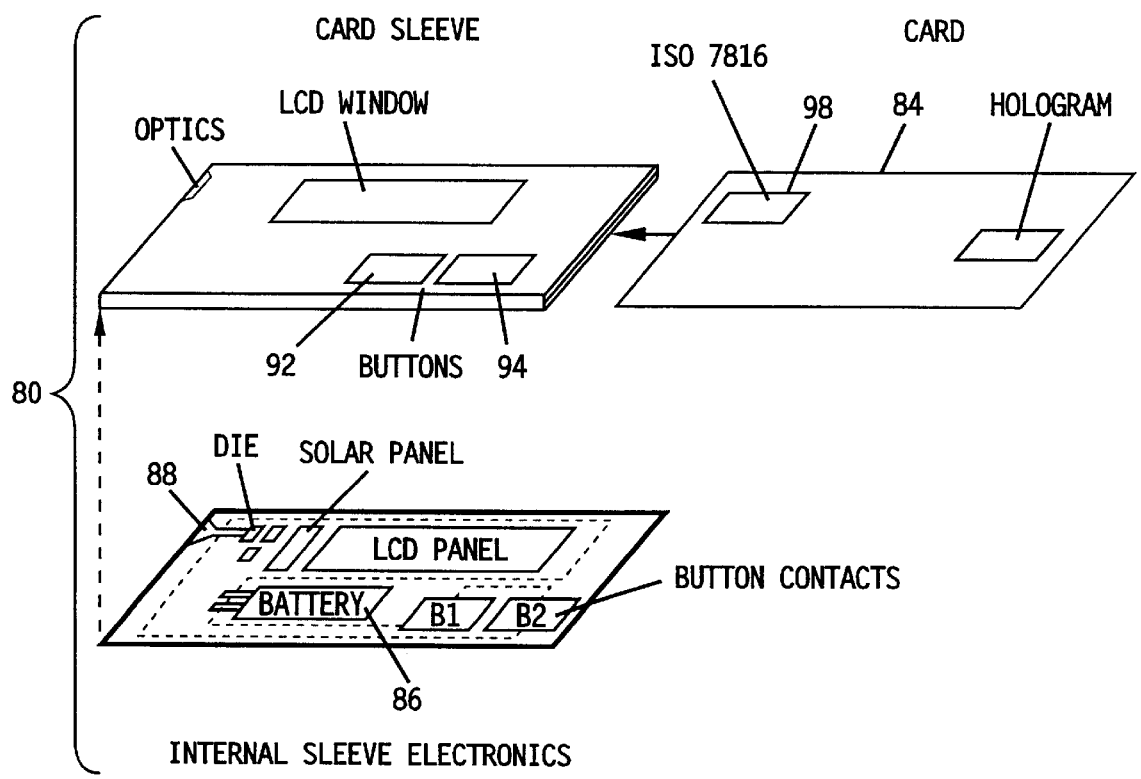
FIG. 5 illustrates an alternate embodiment of the smart card of the present invention.

FIG. 5 illustrates an alternate embodiment of the smart card of the present invention. An electronic sleeve 80 defines a slot 82 for receiving a smart card 84 and the electronic sleeve 80 contains a battery 86, optics for receiving light from a display and a user interface including LCD 90 and buttons 92 and 94. Since these components reside within the electronic sleeve 80, the smart card 84 illustrated in the figure need not contain these components. The smart card 84 interfaces with the electronic sleeve 80 through an ISO 7816 contact 98 as illustrated.

Veil Encoding

As previously described, the smart card 10 receives light from the television display 13 where the light has been encoded within a broadcast program. According to the present invention, non-visual data encoded through VEIL protocol may be transmitted according to any type of packet protocol. In a preferred embodiment, the packet protocol comprises packets with five fields in each packet. The fields include a general purpose packet identification field, an owner identification field, an encrypted authorization key, a packet identification field and packet data. The packet identification field provides information regarding the type of data in the data field. For example, the packet identification field may indicate that the data is related to coupons, frequent flier miles or movie schedules. The packet identification field may also be used to define "generic" classes of opportunities, which can serve to limit the amount of explanative information to be transmitted.

According to the present invention, the VEIL data may be encrypted. Preferred data encryption methods include DES and RSA based public key encoding, and more specifically, RC5 type encoding. Also, the VEIL data may be compressed and error detection and correction applied according to Hamming or Goppa codes.

As described in the copending application entitled "COM-CARD", filed Jan. 19, 1994, Ser. No. 08/183,525, the smart card 10 is capable of receiving coupons in the form of UPC codes. The bar code contains manufacturer identification, family code and value code data that may be used for most coupons. The manufacturer identification and family code contain manufacturer specific data that may be stored in the ROM 50 for a subset of manufacturers. This data may then be used to automatically extract the manufacturer name, product name and size from the bar code data. The value code is universal and may be used to extract the coupon redemption value.

Applications

The apparatus illustrated in FIGS. 1–5 has a variety of applications, including but not limited to: remote financial services, secure and automated payment medium, near video-on-demand with automated order and billing, pay-per-view with automated order and billing, appointment TV, home shopping, retail services, catalogues, travel services, etc, real-time market studies and opinion polls and electronic gaming and sweepstakes. This Specification will now describe these applications.

Financial Services Application

The smart card 10 is capable of performing a variety of financial services applications. When the smart card 10 is issued to a particular user, the EEPROM memory 54 within the smart card 10 stores multiple account information for remote financial services. The multiple account information includes: financial institution(s) access information, account number(s), account type(s) and transaction type(s). According to the present invention, a plurality of accounts for a plurality of financial institutions may be stored on one card. Further, the financial and account information may be automatically updated or modified through the telephone interface illustrated in FIGS. 1 and 4.

The user initiates a financial transaction by providing input to the smart card 10 through the buttons 30 and 32 as illustrated in FIG. 3. The user requests a specific financial transaction such as a balance inquiry by selecting an appropriate graphical icon on the LCD 34. Once the transaction has been selected, the LCD 34 prompts the user to press a button 30 to carry out the transaction. Additionally, the smart card 10 may prompt the user with an audible tone.

After receiving the request from the user, prestored information in the ROM 50 or EEPROM 54 and a predefined messaging protocol are provided to the modem 42 or the wireless interface which automatically contact, through the appropriate medium, the financial institution. The smart card 10 and financial institution then exchange data to carry out a fully automated transaction. When the transaction is complete, the smart card 10 LCD 34 provides a summary of the transaction results. For enhanced security, a transaction process may require the smart card 10 user to enter a PIN code, using the buttons 30 or 32 on the smart card 10, which will be authorized by the financial institution prior to carrying out the transaction.

Near Video-On-Demand and Pay-Per-View Application

As previously described, the smart card 10 is optically coupled to the display 13 of a television to receive information encoded with a television signal. A television service provider may thus provide over a television channel information related to programs and movies available on a pay-per view or on-demand basis. As described in the related application entitled "COM-CARD", filed Jan. 19, 1994, Ser. No. 08/183/525, the user may then download this information through the VEIL interface. Once this information has been transferred to the smart card 10, the user may select from the available programming using the graphical menu-driven interface on the LCD 34. The user then selects the physical location where the programming is to be provided. Such physical locations may include any location corresponding to account address(es) stored in the smart card 10 or the location corresponding to the phone number used to place the order.

After selection occurs, the modem 42, or the wireless interface automatically contact the appropriate service provider and the transaction is automatically completed, including debiting the account of the user, through a predefined messaging protocol. The telephone numbers for service providers may be stored in the smart card 10 based upon the channel over which the information is received. Alternatively, the telephone number of the service providers may be provided within this information.

Once the transaction has been authorized, information related to the program time and channel will be sent to the smart card 10 and displayed on the LCD 34 for the user. As previously described, security can be enhanced by requiring the user to enter a PIN code, using the buttons 30 or 32 on the smart card 10, which will be authorized by the near video on demand or pay per view system prior to activating the program selection.

Appointment and Coupon Television

The interfaces illustrated in FIG. 1 may also be used to provide other services such as "virtual shopping," financial services, entertainment programming and educational programming.

"Virtual shopping" includes a variety of applications. For example, the television display 13 may show a guided tour through a supermarket pointing out key nationally advertised items. Each of these items can be introduced and presented by a product spokesperson and followed with a commercial including a paperless coupon that may be provided to the user through the VEIL interface. For a description of the use of a smart card 10 in conjunction with coupons, see the related application entitled "COM-CARD", filed Jan. 19, 1994, Ser. No. 08/183/525.

The present invention also provides for appointment television. A catalogue of programming may be displayed on a television and the user may download this catalogue using the VEIL interface of the smart card 10 and select which program to view. Once a program is selected, the LCD 34 will prompt the user to enable the modem 42 or wireless interface to automatically contact the proper television network. The program will be broadcast at the proper time and the smart card 10 may be programmed to remind the user with an audio tone and visual display at predetermined times before the program is initiated.

In addition to appointment television, the smart card 10 may remind the user of advertising/promotional, financial, and programming incentives.

Home Shopping Application

The smart card 10 of the present invention may be used in conjunction with home shopping. A home shopping network may broadcast an item for sale and information regarding that item may be downloaded through the VEIL interface as illustrated in the figures. The information regarding the item may include: home shopping program access information, item name, item description, item price and item commercial and programming rerun times.

If the user is interested in purchasing the item, he or she may then download item information into the smart card 10 through the VEIL interface. The LCD 34 then displays the item information and the user is prompted to choose whether he or she intends to purchase the item. If the user decides to purchase the item, the LCD 34 prompts the user to enable the modem 42 or wireless interface. The smart card 10 then uses the access information to automatically dial a home shopping program automated service computer to place the order using a predefined messaging protocol. Billing is automatically directed to the user's account using the card holder's billing address for shipping.

After the transaction is complete, information regarding the status of the order may be displayed on the LCD 34, including the cost and shipping time. To provide additional security, a transaction process may require the user to enter a PIN code, using the buttons 30 or 32 on the smart card 10, which will be authorized prior to carrying out the transaction.

Data Gathering Applications

Market Studies and Opinion Polls

The present invention as illustrated in FIGS. 1–5 may be used to efficiently gather data. A market study or opinion poll questionnaire may be broadcast over the television through the VEIL interface as illustrated in FIG. 1. The poll or study may be delivered to selected regions or on a national basis. As an example of this application, the card user will be presented with a list of questions on the LCD 34 or television display 13 and requested to select an answer. The smart card 10 will then prompt the card holder to enable the modem 42 or wireless interface which automatically connects with a remote computer system.

The card holder's response to the questionnaire will then be automatically transferred to the remote computer system through the modem 42 or the wireless interface. In addition to the card holder's response, information related to the card holder can be transferred to the remote computer system,. This information can include, for example, the card holder's age, sex, geographical location or other demographic data. The serial number stored in the smart card 10 can be used to eliminate multiple responses from a single card holder.

Coupon Encoding

The smart card 10 of the present invention may also be used to gather information at a point of sale. As described in the related "COM-CARD" application, filed Jan. 19, 1994, Ser. No. 08/183/525, the smart card 10 of the present invention may receive a coupon over the VEIL interface and the coupon may be redeemed at a point of sale by scanning the UPC code related to the coupon. The UPC code is displayed on the LCD 34.

In addition to distributing coupons, manufacturers and other persons have a need to gather data related to coupon redemption. Currently, such information is typically gathered through coupon clearing houses, which have questionable security and are relatively inefficient. The smart card 10 provides an efficient and secure alternative to clearinghouses. Confidential data regarding the card holder is encoded within the extended fields of a UPC code. In order to prevent unauthorized use of the confidential data by third party retailers, clearinghouses, and redemption centers, this information is encrypted.

The following fields are defined in the extended UPC code:

1) NSC Code;
2) One digit manufacturer's number system character;
3) Offer Code: five digit element;
4) Coupon expiration date: four digit month/year of coupon expiration; and
5) Household identification: eight digit element.

In a preferred embodiment, the five digit offer code and eight digit household identification include encrypted confidential and proprietary measurement data. This provides a minimum of 13 decimal digits or the equivalent of 43 bits of measurement data. Data will be encrypted using a DES-type encryption technique and then dynamically displayed on the LCD 34 for coupon redemption. The exact information that will be conveyed at the point of sale may be determined on the basis of the type of coupon which includes, without limitation, the following types of data relevant to the card holder: age, sex, demographic data and psychographic data. The data may then be analyzed by a party who has obtained the proper decryption key.

In addition, the source of the coupon, for example the television program the coupon was encoded onto, can be dynamically added to the bar code data before redemption for providing this measurement data when the coupon is redeemed.

VCR Applications

The smart card 10 may be used to program video cassette recorders (VCR's). Date and time information for a program may be provided through the VEIL interface and a promotion for the show simultaneously broadcast to the user. If the user wishes to tape the show, the user may download the program information by depressing an appropriate key 30 or 32 on the smart card 10.

Figure 6A:
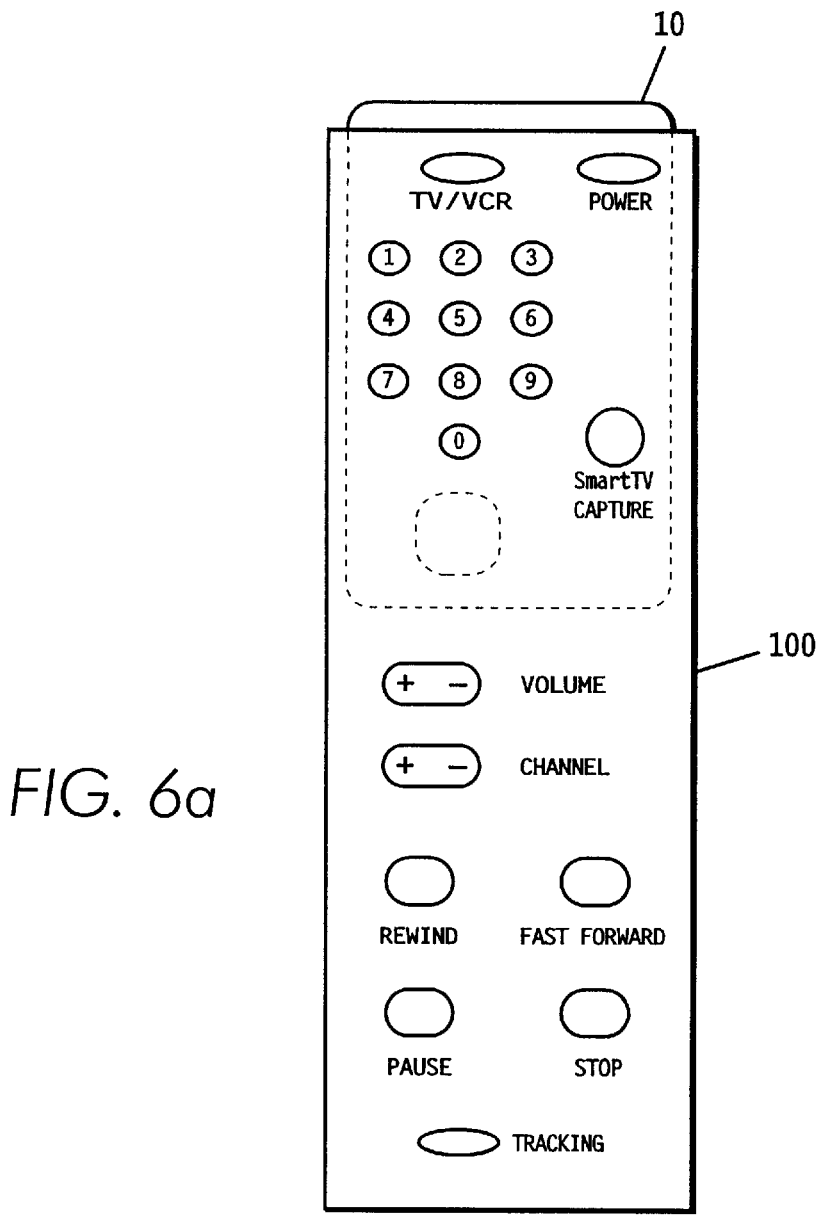
FIG. 6a illustrates the smart card inserted into a VCR remote control.
Figure 6B:
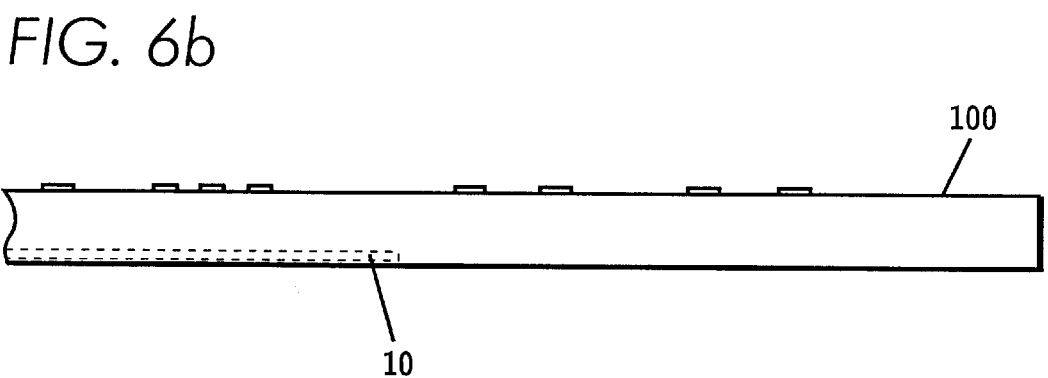

Once the program information is stored in the smart card 10, it may be provided to a VCR. FIG. 6a illustrates the smart card 10 inserted into a VCR remote control 100 with a slot for receiving the smart card 10 and FIG. 6b is a side view of the embodiment illustrated in FIG. 6a. The smart card 10 provides the program information to the VCR through the VCR remote control 100. Using a standard infrared interface, the VCR is automatically programmed, without viewer input or use of the television picture for displaying menus.

Real-Time Interactive Applications

It will be appreciated that the interfaces illustrated in FIG. 1 support real time interactive applications. For example, a game show may be displayed over the television display 13 and information related to the show downloaded into the smart card 10. A viewer may play the game by providing input to the smart card 10 which then dials the appropriate numbers to provide the user's input to a game server.

Although the present invention has been described in terms of a preferred embodiment and with reference to FIGS. 1–6b, it will be appreciated that various modifications and alterations might be made by those skilled in the art without departing from the spirit and scope of the invention. For example, instead of receiving light from a television display, the smart card may be optically coupled to a computer screen for receiving data over a computer network. Many other alternatives are possible. The invention should therefore be measured in terms of the claims which follow.

We claim:

1. A smart card for providing remote services comprising:
   a light sensor for receiving non-visual data transmitted from a display, said non-visual data encoded within light from said display;
   a central processing unit (CPU);
   a memory coupled to said CPU and said light sensor for storing said data; and
   interfacing means coupled to said CPU for interfacing with a remote service provider.

2. The apparatus of claim 1 wherein said apparatus comprises a unitary device.

3. The apparatus of claim 2 wherein said unitary device is substantially the same dimensions as a credit card.

4. The apparatus of claim 1 further comprising an LCD display.

5. The apparatus of claim 1 further comprising a plurality of buttons for providing input to said memory.

6. A method for providing remote services comprising the steps of:
   transmitting from a display non-visual data over a television channel, said non-visual data related to a transaction source;
   optically receiving in a smart card said data transmitted from the display;
   extracting a telephone number from said non-visual data;
   providing said telephone number to a communication interface; and
   carrying out a transaction with said transaction source.

7. The method of claim 6 wherein said step of providing said telephone number to a modem is operative after a user provides input to said smart card.

8. The method of claim 6 wherein said transaction includes a debit to a user's account and said method further comprises the step of automatically debiting said user's account.

9. The method of claim 6 wherein said transaction relates to a pay-per-view television broadcast.

10. The method of claim 6 wherein said transaction relates to the purchase of an item from said transaction source.

11. The apparatus of claim 1 wherein the non-visual data is encoded through a VEIL protocol.

12. The apparatus of claim 1 wherein the non-visual data is encoded and transmitted independent of any designated location within the display.

13. The apparatus of claim 1 wherein the non-visual data is encoded within light from the full screen of said display.

14. The method of claim 6 wherein the non-visual data is encoded through a VEIL protocol.

15. The method of claim 6 wherein the non-visual data is encoded and transmitted independent of any designated location within the display.

16. The method of claim 6 wherein the non-visual data is encoded within light from the full screen of said display.

17. A smart card for providing remote services; comprising:

sensor means for receiving non-visual optical video signal transmitted from a source;

a central processing unit (CPU);

a memory coupled to said CPU and said sensor means for storing said data; and a modem coupled to said CPU for communicating with a remote service provider.

18. The apparatus of claim 17 wherein the non-visual optical video signal is encoded through a VEIL protocol.

19. The apparatus of claim 17 wherein said non-visual optical video signal is received independent of hardwired connection between the sensor means and the source.

20. An apparatus for providing remote services comprising:

a smart card;

a sensor disposed on the smart card for sensing non-visual data transmitted from a display, said non-visual data encoded within light from said display; and interfacing means on the smart card for interfacing with a remote service provider in relation to the non-visual data.

21. An apparatus for providing remote services comprising:

a smart card;

a sensor disposed on the smart card for recognizing non-visual optical signals encoded within the content to be displayed from a display; and interfacing means on the smart card for interfacing with a remote service provider in relation to the non-visual data.

22. A method for providing remote services comprising the steps of:

transmitting from a display non-visual optical signals encoded within the content to be broadcast via television;

providing a smart card having a sensor disposed thereon for recognizing said non-visual optical signals;

sensing said non-visual optical signals using the sensor; and interfacing with a remote service provider in relation to the non-visual optical signals.

* * * * *